(12) United States Patent
Gustafson et al.

(10) Patent No.: US 9,746,132 B2
(45) Date of Patent: Aug. 29, 2017

(54) SELF-SATURATING LIQUEFIED NATURAL GAS DELIVERY SYSTEM UTILIZING HYDRAULIC PRESSURE

(71) Applicant: CHART INC., Ball Ground, GA (US)

(72) Inventors: Keith Gustafson, Ball Ground, GA (US); Erik Gustafson, Ball Ground, GA (US)

(73) Assignee: Chart Inc., Ball Ground, GA (US)

( * ) Notice: Subject to any disclaimer, the term of this patent is extended or adjusted under 35 U.S.C. 154(b) by 661 days.

(21) Appl. No.: 13/623,048

(22) Filed: Sep. 19, 2012

(65) Prior Publication Data

US 2014/0075965 A1 Mar. 20, 2014

(51) Int. Cl.
*F17C 7/04* (2006.01)
*F02M 21/02* (2006.01)

(52) U.S. Cl.
CPC .............. *F17C 7/04* (2013.01); *F02M 21/023* (2013.01); *F02M 21/0215* (2013.01); *F02M 21/0221* (2013.01); *F02M 21/0287* (2013.01); *F17C 2201/056* (2013.01); *F17C 2201/058* (2013.01); *F17C 2205/0134* (2013.01); *F17C 2221/033* (2013.01); *F17C 2223/0153* (2013.01); *F17C 2223/0161* (2013.01); *F17C 2227/0107* (2013.01); *F17C 2227/0302* (2013.01); *F17C 2227/0393* (2013.01); *F17C 2265/066* (2013.01); *F17C 2270/0178* (2013.01); *Y02T 10/32* (2013.01)

(58) Field of Classification Search
CPC ...... F17C 7/00; F17C 7/02; F17C 7/04; F17C 2205/0149; F17C 2205/013; F17C 2270/0165; F17C 2270/0171; F17C 2270/0176; F17C 2270/0178; F17C 2265/066; F17C 2227/03; F17C 2227/0302; F17C 2227/0306; F17C 2227/0367; F17C 2227/0369; F17C 2227/0374; F17C 2227/0393; F17C 2205/0134; F17C 2205/0138; F17C 2205/0142; F17C 2205/0146; F17C 2205/0338; F17C 2205/0335
USPC .............................. 62/50.1, 50.2, 50.7, 53.2
See application file for complete search history.

(56) References Cited

U.S. PATENT DOCUMENTS

| | | | |
|---|---|---|---|
| 3,650,290 A * | 3/1972 | Moen .................... | F17C 13/025 137/339 |
| 4,579,566 A * | 4/1986 | Brugerolle ....................... | 62/903 |
| 4,620,962 A * | 11/1986 | Brodbeck ....................... | 62/50.2 |
| 5,127,230 A * | 7/1992 | Neeser et al. ....................... | 62/7 |
| 5,163,409 A | 11/1992 | Gustafson et al. | |
| 5,373,700 A * | 12/1994 | McIntosh ....................... | 62/50.2 |
| 5,373,701 A * | 12/1994 | Siefering et al. .............. | 62/50.4 |
| 5,404,918 A * | 4/1995 | Gustafson ......................... | 141/1 |
| 5,421,161 A | 6/1995 | Gustafson | |
| 5,421,162 A * | 6/1995 | Gustafson et al. ............ | 62/50.1 |

(Continued)

*Primary Examiner* — Etsub Berhanu
*Assistant Examiner* — Nelson Nieves
(74) *Attorney, Agent, or Firm* — Mintz Levin Cohn Ferris Glovsky and Popeo, P.C.

(57) ABSTRACT

Described herein are at least systems and methods for cryogenic fluid delivery which utilize pumpless delivery of cryogenic fluid. The systems and methods utilize hydraulic pressure, saturation pressure, or a combination of both hydraulic pressure and saturation pressure to deliver cryogen to a use device, such as an engine.

4 Claims, 2 Drawing Sheets

(56) References Cited

U.S. PATENT DOCUMENTS

| | | | |
|---|---|---|---|
| 5,644,921 A * | 7/1997 | Chowdhury | F17C 9/02 62/48.1 |
| 5,884,488 A * | 3/1999 | Gram et al. | 62/50.6 |
| 6,058,713 A * | 5/2000 | Bowen et al. | 62/50.2 |
| 6,085,548 A * | 7/2000 | Chowdhury | B01D 5/0069 62/48.2 |
| 6,494,191 B2 * | 12/2002 | Bingham et al. | 123/527 |
| 6,634,178 B1 * | 10/2003 | Michel | F17C 9/04 62/47.1 |
| 6,659,730 B2 * | 12/2003 | Gram et al. | 62/50.6 |
| 2002/0157402 A1 * | 10/2002 | Drube et al. | 62/50.2 |
| 2005/0098424 A1 * | 5/2005 | Mount | 202/170 |
| 2013/0228151 A1 * | 9/2013 | Dunn et al. | 123/294 |
| 2013/0232997 A1 | 9/2013 | Gustafson | |

* cited by examiner

SELF-SATURATING LIQUEFIED NATURAL GAS DELIVERY SYSTEM UTILIZING HYDRAULIC PRESSURE

BACKGROUND

Many heavy-duty vehicle engines that run on liquid natural gas (LNG) require that the intake vapor pressure of the natural gas into the fuel tank be at a certain level, such as around 100 psig. In most markets, LNG is saturated, or heat is added, to a point at which its vapor pressure is roughly equal to the pressure required by the use device (such as a vehicle). This process of building saturation pressure is typically performed at LNG fueling stations. However, in some markets, the saturation of the fuel before transferring it from the LNG fueling stations to the vehicle storage tank is not performed. Thus, the storage tank in the use device (for example, vehicle) ends up being filled with LNG well below the desired pressure. This can lead to reduced vehicle performance.

One proposed method for building storage tank pressure is to utilize a pressure building circuit that is common on many stationary cryogenic cylinders. These circuits function by utilizing gravity to feed liquid cryogen into an ambient vaporizer. Upon vaporization of the liquid, its volume expands and the vapor is routed to a vapor space above the cryogen. This builds a head of vapor pressure above the liquid in the tank. However, there are two distinct problems with this type of circuit for LNG vehicle tanks. First, as most LNG vehicle tanks are mounted horizontally, there is small liquid head pressure (compared to a vertical tank) to force liquid into the ambient vaporizer. Second, since LNG vehicle tanks are used in mobile applications, any vapor pressure that is built above the liquid phase will quickly collapse as soon as the vehicle is in motion and the liquid and vapor phases mix. It may take several hours or more than a day to add enough heat in this fashion to fully saturate the bulk of LNG in the tank.

Another proposed solution is referenced in U.S. Pat. No. 5,163,409 whereby compressed natural gas (CNG) is used to add vapor pressure above LNG to deliver the fuel at an elevated pressure. However, this solution requires a second tank for CNG be mounted on the vehicle, which would undesirably add weight and occupy space on the vehicle chassis.

SUMMARY

Disclosed is a liquid natural gas (LNG) fuel delivery system that overcomes at least the aforementioned shortcomings of the prior art. The system includes an overflow tank contained within a primary LNG tank. Liquid natural gas, which may be at a lower than desired saturation pressure is transferred into the primary tank, until the primary tank is completely or nearly full. A use device, such as an engine, can withdraw LNG from the primary tank.

As the use device withdraws LNG from the primary tank, the withdrawn LNG passes through a vaporizer, which vaporizes the LNG into a gas. The gas then passes through a pathway that reenters into the primary tank. The gas re-condenses in this pathway, thereby adding heat to the LNG in the primary tank. The added heat increases the saturation pressure of the LNG in the primary tank, thereby causing the LNG to expand. In addition, the added heat decreases the density of the LNG in the primary tank. After a time period (such as several minutes) of LNG withdrawal from the primary tank, the density of the LNG in the primary tank will be such that the primary tank is hydraulically full, at which point the pressure within the primary tank represents the hydraulic pressure exerted by the LNG.

A regulator allows excessive fluid caused by the LNG expansion to flow from the primary tank to the overflow tank via an overflow line. The pressure in the primary tank is now controlled hydraulically by the regulator's set pressure. Because the overflow tank is thermally connected to the primary tank and is not hydraulically full, the pressure in the overflow tank will be the saturation pressure of the liquid in the primary tank. As the saturation pressure is lower than the hydraulic pressure, all flow through the regulator will be from the primary tank to the overflow tank. During this point in operation, although the LNG in the primary tank is not saturated to a point at which its vapor pressure could supply the use device with the desired pressure, by utilizing the available hydraulic pressure, the primary tank is able to provide sufficient pressure to the use device.

As the use device continues to withdraw liquid and add heat to the liquid in the primary tank, its vapor pressure will increase until it reaches the set pressure of the regulator. Due to the thermal connection to the primary tank, the vapor pressure in the overflow tank will approach the same pressure as the primary tank. When enough heat has been added to the primary tank to increase its saturation pressure to the same level as the hydraulic pressure maintained by the regulator, both the main tank and the overflow tank will be at the same pressure. Either the main tank or the overflow tank will be able to supply a pressure desired by the engine. After this point, the LNG delivery system functions much like the system described in U.S. Pat. No. 5,421,161, which is incorporated herein by reference.

In some aspects, a tank apparatus can be coupled with a use device, such as an automobile engine. The tank apparatus can include a main tank and an overflow tank. Based on hydraulic pressure by liquefied gas that fills the main tank, pressurized liquefied gas can be provided to the use device and overflow liquefied gas can be provided to the overflow tank. When the pressurized liquefied gas is provided to the use device, the liquefied gas in the main tank can be heated to increase saturation pressure associated with the liquefied gas in the main tank. Based on a comparison of the saturation pressure with the hydraulic pressure, a continuous supply of the liquefied gas can be provided to the use device from at least one of the main tank and the overflow tank.

In some variations, one or more of the following can optionally be included. The liquefied gas can be a cryogenic liquid, such as liquid natural gas (LNG). The pressurized cryogenic liquid can have a pressure more than a threshold based on efficient performance of the use device. The threshold can be configured to be regulated using a regulator. When the saturation pressure associated with cryogenic liquid in the main tank is increased, saturation pressure associated in the overflow tank can be proportionally increased. The continuous supply of liquefied gas can be facilitated by the hydraulic pressure of the main tank when the hydraulic pressure in the main tank may be more than the saturation pressure in the main tank. The continuous supply of liquefied gas can be facilitated by the saturation pressure of at least one of the main tank and the overflow tank when the hydraulic pressure in the main tank may be one of less than and equal to the saturation pressure in the main tank.

In another aspect, a system is described that can include a main tank, an overflow tank, a liquid tube, a first vaporizer, and a withdrawal tube. The main tank can be coupled with a use device. The main tank can be filled with a cryogenic liquid via a fill tube. The filling of the main tank can cause a hydraulic pressure in the main tank to be equal to or more than a first threshold. The hydraulic pressure can cause a provision of cryogenic liquid to the use device. The overflow tank can be contained within the main tank. The overflow tank can be thermally connected to the main tank. The overflow tank can be configured to obtain a regulated overflow of the cryogenic liquid. The liquid tube can remove some cryogenic liquid in the main tank due to the hydraulic pressure in the main tank. The first vaporizer can be coupled to the liquid tube. The first vaporizer can heat at least a portion of remaining cryogenic liquid in the main tank. The heating of the remaining portion of the cryogenic liquid can increase the saturation pressure of the remaining cryogenic liquid in the main tank and increase the saturation pressure of the cryogenic liquid in the overflow tank. The withdrawal tube can be selectively coupled to at least one of the liquid tube, a vapor tube, and an overflow tube. The withdrawal tube can provide, based on a comparison of the hydraulic pressure in the main tank and the increased saturation pressure in the main tank and the overflow tank, a substantially continuous supply of cryogenic liquid from at least one of the main tank and the overflow tank, to the use device.

In a few variations, one or more of the following can optionally be included. The use device can be an engine that uses the cryogenic liquid. The cryogenic liquid can be liquid natural gas. The system can further include a second vaporizer that can be coupled to the withdrawal tube. The second vaporizer can heat the cryogenic liquid being supplied to the use device. The system can further include a regulatory valve that can be coupled to a vapor tube configured to carry overflow cryogenic liquid from the main tank to the overflow tank when the hydraulic pressure in the main tank may be more than the saturation pressure in the main tank. The regulatory valve can be configured to regulate the first threshold. The thermal connection between the main tank and the overflow tank can allow the saturation pressure in the main tank to be equal to the saturation pressure in the overflow tank. The substantially continuous supply of liquefied gas can be facilitated by the hydraulic pressure of the main tank when the hydraulic pressure in the main tank is more than the saturation pressure in the main tank, and can be facilitated by the saturation pressure of the main tank and the overflow tank when the hydraulic pressure in the main tank may be one of less than and equal to the saturation pressure in the main tank.

In a further aspect, based on hydraulic pressure in a main tank filled with liquid natural gas, pressurized liquid natural gas can be provided to an engine coupled to the main tank and overflow liquid natural gas can be provided to an overflow tank contained within the main tank. When the pressurized liquid natural gas is provided to the use device, the liquid natural gas in the main tank can be heated to increase saturation pressure associated with the liquid natural gas in the main tank. Based on a comparison of the saturation pressure with the hydraulic pressure, a continuous supply of the liquid natural gas can be provided to the use device from at least one of the main tank and the overflow tank.

In some variations, one or more of the following can be optionally included. The continuous supply of the liquid natural gas can include: supply of liquid natural gas from the main tank when the hydraulic pressure in the main tank is more than the saturation pressure in the main tank; and supply of liquid natural gas from the overflow tank when the hydraulic pressure in the main tank is one of less than and equal to the saturation pressure in the main tank. The continuous supply of the liquid natural gas can further include supply of liquid natural gas from the main tank when the hydraulic pressure in the main tank is one of less than and equal to the saturation pressure in the main tank.

Other features and advantages should be apparent from the following description of various embodiments, which illustrate, by way of example, the principles of the disclosure.

DETAILED DESCRIPTION

Disclosed is a cryogenic fluid storage and delivery system. The system is primarily described herein in the context of being used for a horizontal liquid natural gas pressure vessel that provides vehicular fuel to natural gas engines. However, it should be appreciated that the system can be used with any of a variety of mobile horizontal delivery tanks such as liquid nitrogen pressure vessels used for in-transit refrigeration. Moreover, although the disclosure is primarily described in terms of supplying fuel to an engine, it should be appreciated that the disclosed system may be configured for use with any application that uses cryogenic fluids.

Figure 1:
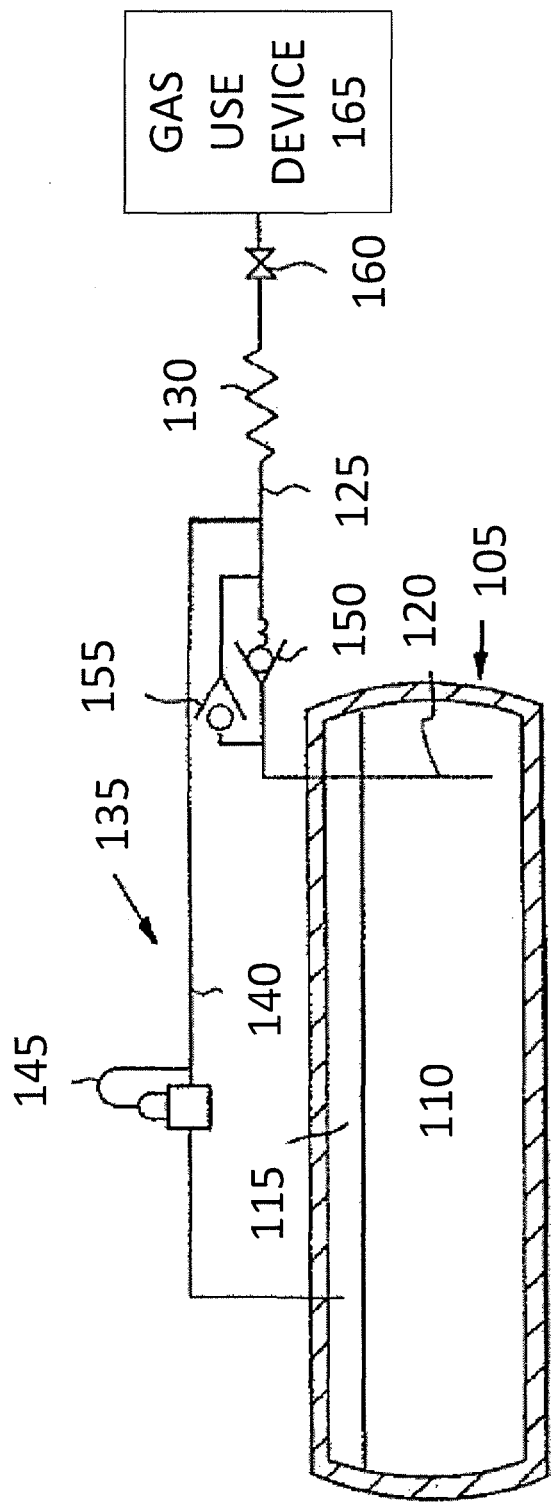
FIG. 1 shows an exemplary system diagram of a cryogenic fluid storage and delivery system with a horizontal pressure vessel and an economizer circuit.

FIG. 1 shows an example of a cryogenic storage and delivery system that delivers a cryogenic fluid to a device, such as a vehicle powered by cryogenic fluid. The system includes a pressure vessel 105 that contains a cryogenic liquid 110 and a layer of vapor 115 above the cryogenic fluid. A liquid tube 120 extends into the cryogenic liquid 110 and communicates with a withdrawal line 125 that connects to a gas use device 165. A vaporizer 130 is positioned along the withdrawal line 125 for vaporizing the fluid before it is delivered to the gas use device 165. A control valve 160 is also positioned along the withdrawal line 125. Cryogenic liquid 110 or vapor 115 is provided to the withdrawal line 125 while the control valve 160 is open. When the control valve 160 is closed, cryogenic liquid or vapor may return to the pressure vessel through check valve 155.

An economizer circuit 135 provides a pathway for the vapor 115 to flow out of the pressure vessel 105. The economizer circuit 135 includes a vapor line 140 coupled to a back-pressure regulator 145. The regulator 145 opens at a predetermined pressure to permit release of the vapor 115 from the pressure vessel 105. The regulator 145 senses the pressure in the vapor line 140 and opens or closes appropriately.

Still with reference to FIG. 1, the withdrawal line 125 includes a relief valve 150 located downstream of the liquid tube 120 and upstream of the vaporizer 130. The withdrawal line 125 also includes check valve 155 that allows cryogenic liquid or vapor to return to the pressure vessel 105.

The pressure relief valve 150 is configured to provide a predetermined level of back pressure in the liquid tube 120 that is greater than the back pressure in the economizer circuit 135. When the regulator 145 is open, the vapor 115 will preferentially flow out of the pressure vessel 105 to the use device 165 via the economizer circuit 135, which provides the path of least resistance out of the pressure vessel 105 as a result of the back pressure in the liquid tube 120 provided by the relief valve 150. Upon closing of the regulator 145, the liquid 110 flows out of the pressure vessel 105 via the liquid tube 120 through the pressure relief valve 150 to the use device 165.

The relief valve 150 and check valve 155 collectively enable the system of FIG. 1 to work efficiently. The check valve 155 provides an unimpeded back flow path for liquid and vapor to return from the vaporizer 130 toward the pressure vessel 105. Because the check valve permits a free flow of vapor and liquid from the withdrawal line 125 to the pressure vessel 105, the backflow of heat to the pressure vessel is always available to assist the pressure vessel 105 in maintaining or building pressure, independent of the regulator 145 setting.

The cryogenic storage and delivery system shown in FIG. 1 and alternative cryogenic storage and delivery systems are described in greater detail in U.S. patent application Ser. No. 13/413,104, filed Mar. 6, 2012, and in U.S. Pat. No. 5,421,161, both of which are incorporated herein by reference in their entirety.

Cryogenic fluid storage and delivery systems currently used in vehicles operate under conditions that may not fully leverage the pumpless delivery of fuel to the use device. In liquid fuel storage and delivery system, as found in a conventional vehicle that uses gasoline, a pump moves the liquid fuel from the storage tank to the engine where the fuel reacts with oxygen and causes motion. In contrast, in vehicles that use cryogenic fluid as fuel, such as LNG powered vehicles, the storage and delivery systems might only rely on the saturation pressure of the liquid within the pressure vessel, or storage tank, to expel fluid from the vessel and move it down through the delivery lines to the vaporizer and use device. The saturation pressure varies with the temperature of the system, such that as the temperature increases, the pressure exerted by the vapor above the liquid cryogen increases.

Figure 2:
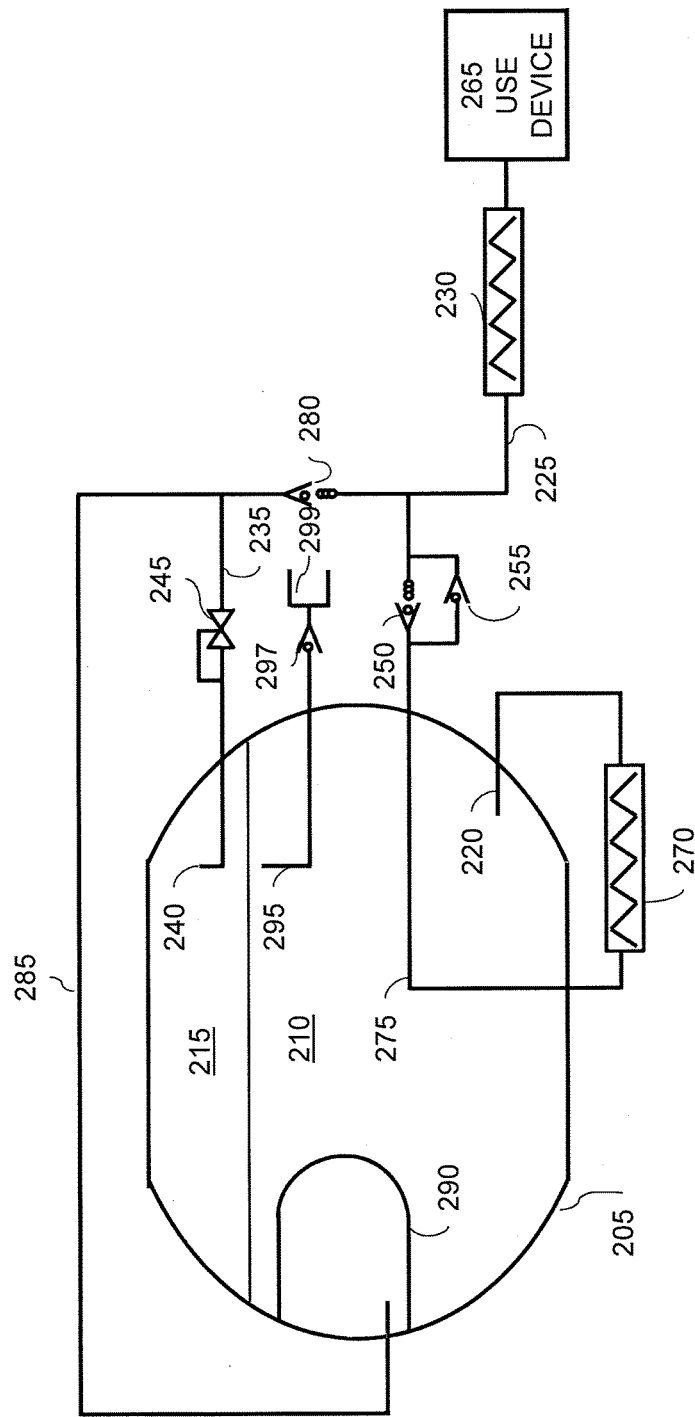
FIG. 2 shows an exemplary system diagram that includes a pressure vessel that utilizes both hydraulic and saturation pressure to deliver fluid.

FIG. 2 shows an alternative cryogen storage and delivery system that maintains the safety and ability to utilize the heat from fluid flowing back from the withdrawal line into the pressure vessel, as described with respect to FIG. 1, but that also allows for the use of hydraulic pressure to supply fuel to the use device until the saturation pressure in the pressure vessel become sufficient. The system shown in FIG. 2 includes a primary tank 205 that contains cryogenic liquid 210 with a vapor head 215 above it. An overflow tank 290 is contained within the primary tank 205. A fill line 295 communicates with the primary tank 205 and can be used to fill the primary tank via a check valve 297 and a releasable connector 299.

The cryogen storage and delivery system has a liquid tube 220 with an end positioned in the cryogenic liquid 210. The liquid tube 220 is located near the bottom of primary tank 205. Furthermore, a vapor line 240 has an end within the vapor head 215 located near the top of primary tank 205 and communicates with an overflow line 285. Thus, vapor 215 can pass through the vapor line 240 to the overflow tank 290 via the overflow line 285. Both the liquid tube 220 and the vapor line 240 communicate with a withdrawal line 225 that passes through a vaporizer 230 and supplies fuel to the use device 265. The liquid tube 220 passes outside the primary tank 205 where it connects to a vaporizer 270. The vaporizer 270 in turn connects to a condensing pathway 275 positioned inside the primary tank 205 in contact with the contents (i.e. the cryogenic fluid) of the primary tank 205. The condensing pathway 275 connects to a relief valve 250 and a check valve 255, similar to those in the system shown in FIG. 1. Eventually the condensing pathway 275 leads to the withdrawal line 225. In this manner, cryogenic liquid 210 can pass from primary tank 205 to the withdrawal line 225 via the liquid tube 220 and the condensing pathway 275.

With reference still to FIG. 2, the cryogen storage and delivery system also has an economizer circuit 235 that includes the vapor line 240 that includes a regulator 245 and a check valve 280. The check valve 280 is located between where the vapor line 240 joins the withdrawal line 225 and where the condensing pathway 275 joins the withdrawal line 225. The regulator 245 communicates with the overflow line 285 that leads to the overflow tank 290. Due to the plumbing configuration shown in FIG. 2, the overflow tank 290 cannot have a pressure that exceeds that of primary tank 205. Also, the primary tank 205 can be at a pressure greater than the pressure of the overflow tank 295.

The cryogen storage and delivery system of FIG. 2 may deliver cryogen from the primary tank 205 utilizing the hydraulic pressure built up in the primary tank 205 or it may utilize the saturation pressure to deliver cryogen. The cryogen storage and delivery system may deliver cryogen to the use device 265 using hydraulic pressure within the primary tank 205 and then switch to using saturation pressure to drive the delivery of cryogen. These modes of operation are explained in greater detail below.

It is desirable to fill the cryogen storage and delivery system of FIG. 2 to nearly 100% of the capacity of the primary tank 205 with liquid cryogen and use the system to provide fuel to a use device 265. In such a scenario, the main portion of the primary tank 205 is filled with cryogen through the fill line 295, and the overflow tank 290 remains empty until the pressure in the primary tank 205 exceeds the set point of the regulator 245.

In this state, in which the primary tank 205 is predominantly filled with liquid cryogen, when the use device 265 demands fuel, liquid cryogen 210 flows through the liquid tube 220 and is transformed into vapor at the vaporizer 270. The resulting vapor leaves the vaporizer 270 and enters the condensing pathway 275 inside the primary tank 205. As the vapor moves through the condensing pathway 275, it may condense and transfer heat to the liquid cryogen 210 in the primary tank 205. The transferred heat causes the cryogen within the primary tank 205 to expand and become less dense. As the heat transfers to the liquid cryogen in primary tank 205, its density decreases and it begins to occupy more volume at a rate that exceeds that at which is being withdrawn as demanded by use device 265. That is, the volume occupied by liquid cryogen within primary tank 205 increases at a rate that exceeds the volumetric withdrawal rate from the primary tank 205. Thus, the primary tank 205 becomes hydraulically full. Once the primary tank 205 becomes hydraulically full, it rapidly develops an interior pressure greater than the threshold pressure for the regulator 245. This causes the regulator 245 to open and to allow any excessive volume of cryogen to flow out through the vapor line 240 and through the overflow line 285 to the overflow tank 290.

When the interior of the primary tank 205 initially reaches a level that causes the regulator 245 to open, the pressure within the primary tank 205 is much greater than that in the overflow tank 290 (which will be approximately the saturation pressure of the liquid due to the thermal connection between the tanks). This pressure difference directs excess fluid flow preferentially through the overflow line 285 to the overflow tank 290 instead of through the check valve 280 towards the use device 265. As the liquid cryogen expands from the heat provided by the condensation pathway 275, the cryogen is also increasing in saturation pressure. Once the saturation pressure in the primary tank 205 reaches the regulator set pressure, the hydraulic pressure and saturation pressure will be the same, and the use device 265 may begin to accept fluid from the overflow tank 290 and the vapor 215 in the primary tank 205. As the fluid flow through the liquid tube 220 and the vaporizer 270 slows, the amount of heat transferred to the cryogen in the primary tank 205 reduces, and the primary tank 205 will eventually become no longer hydraulically full. When the primary tank 205 is no longer hydraulically full, the system switches to utilizing saturation pressure to deliver cryogen, and then the system of FIG. 2 operates much like that shown in FIG. 1.

A non-limiting exemplary use scenario is one in which an LNG vehicle with a cryogen storage and delivery system as shown in FIG. 2 is initially filled with 40 psig saturated LNG. The optimal operating parameters of the LNG fueled vehicle require that the intake pressure of natural gas by the engine be around 100 psig. The primary tank 205 is initially nearly full of LNG, and the overflow tank is initially nearly empty and may contain vapor at or below 40 psig. The regulator 245 in the economizer circuit 235 is set to 100 psig.

In the exemplary scenario, once the primary tank 205 is filled with cold LNG at 40 psig, the vehicle is operated. The use device 265 (in the form of an engine) begins to draw cryogen from the primary tank 205 through the liquid tube 220. Because the primary tank 205 is full or nearly full of LNG, the hydraulic pressure can feed the fuel to the engine 265. The cryogen passes through the vaporizer 270, is vaporized, and the resulting vapor passes through the condensing pathway 275. The vapor at least partially condenses to a liquid cryogen to transfer heat to the cryogen within the primary tank 205. The cryogen then passes through the relief valve 250, through the withdrawal line 225, through the vaporizer 230, and to the engine 265.

In other words, the engine 265 demands fuel be withdrawn at a certain rate, X. The heat transferred by the cryogen passing through the condensing pathway 275 causes the cryogen in the primary tank 205 to decrease in density (i.e. to increase in volume per unit mass) at a second rate, Y. In the period shortly after the vehicle has been filled with fuel, and the engine initially demands fuel, the rate Y at which the cryogen decreases in density is greater than the rate X at which fuel leaves the pressure vessel. In this case, when Y is greater than X, the primary tank 205 is or becomes hydraulically full.

The hydraulic pressure in the primary tank 205 eventually exceeds the threshold of the regulator 245, such that the hydraulic pressure in the pressure vessel is at least 100 psig. This causes the regulator 245 to open, and cryogen to flow through the overflow line 285 into the overflow tank 290. At this point, the hydraulic pressure in the primary tank 205 is 100 psig, but its saturation pressure is still about 40 psig. Due to the thermal interconnect between the primary and overflow tanks the pressure in the overflow tank will be the liquid's saturation pressure, which is about 40 psig. The check valve 280 is configured to prevent flow from the vapor line 240 and the overflow line 285 to the engine 265 until pressure in those lines approaches or exceeds a threshold value that is near 100 psi.

Once the saturation pressure in the primary tank 205 reaches the regulator's 245 set pressure of 100 psig, the pressure in the overflow tank 290 and primary tank 205 begin to equilibrate due to the thermal interconnect. Since both saturation pressures are now the same, flow through the regulator 245 will now go through check valve 280 into the withdrawal line 225 and on to the use device 265. Liquid will simultaneously flow in parallel out of the overflow tank 290 through line 285 to regulator 245. The primary tank 205 will begin to drain liquid and is no longer hydraulically full. At this time, the cryogen in the primary tank 205 has achieved, or is near achieving, the optimal saturation operating pressure of 100 psig. The check valve 280 allows fuel to flow from the overflow tank 290 and through the vapor line 240 to the engine. As liquid to the withdrawal line 225 is being supplied by parallel paths, the amount of fuel flowing through the liquid tube 220 and the condensing pathway 275 reduces, so that less heat is transferred into the cryogen within the primary tank 205 from the heat exchanger 270. Once the saturation pressure of the cryogen in the primary tank 205 reaches 100 psig and the liquid level in the primary tank has fallen so that the vapor line 240 is in communication with vapor, the system operates with the economizer circuit 235 and the check valve 255 providing pathways of heat flow back into the primary tank 205 from the withdrawal line 225, as in the system of FIG. 1. This exemplary system can provide LNG always, or nearly always, under sufficient pressure to fuel the engine of the vehicle for desired performance.

The cryogen storage and delivery systems described herein may be used with vehicles of various engine types and pressure vessels of various sizes. Engine sizes that may be compatible with cryogen storage and delivery systems described herein include 500 psig engines, 100 psig engines, and the like. It should be appreciated that the pressure values described herein are examples and are not limiting on this disclosure.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Although embodiments of various methods and devices are described herein in detail with reference to certain versions, it should be appreciated that other versions, methods of use, embodiments, and combinations thereof are also possible. Therefore the spirit and scope of the appended claims should not be limited to the description of the embodiments contained herein.

What is claimed:
1. A method comprising:
 filling a main tank with a cryogenic liquid while an overflow tank remains empty;
 coupling a tank apparatus with a use device, the tank apparatus comprising:
 (a) the main tank and the overflow tank contained within the main tank, wherein the main tank contains a vapor head above the cryogenic liquid;

(b) a withdrawal line that passes through a first vaporizer and that leads to the use device;

(c) a vapor line having a first end positioned within the vapor head in the main tank and a second end that communicates with an overflow line via a first pressure regulator such that vapor from the vapor head can pass through the vapor line to the overflow tank via the overflow line and the first pressure regulator, and wherein the vapor line also connects with the withdrawal line;

(d) the overflow line having a first end positioned inside the overflow tank, wherein the overflow line communicates with the withdrawal line;

(e) a liquid line with a first end positioned inside the main tank and a second end positioned outside the main tank, the second end of the liquid line connected to a second vaporizer outside the main tank;

(f) a condensing line having a first end connected to the second vaporizer and a second end connected to the withdrawal line, wherein the condensing line passes through the main tank in contact with the cryogenic liquid in the main tank;

(g) a check valve located between where the vapor line connects to the withdrawal line and where the condensing line connects to the withdrawal line;

flowing liquid cryogen through the liquid line toward the use device and vaporizing the liquid cryogen at the second vaporizer to form a resulting vapor;

passing the resulting vapor through the condensing line and through the main tank toward the use device such that heat is transferred from the resulting vapor to the liquid cryogen in the main tank thereby causing the liquid cryogen in the main tank to expand such that hydraulic pressure in the main tank exceeds a threshold pressure of the first pressure regulator to cause the first pressure regulator to open;

upon the first pressure regulator opening, flowing liquid cryogen out of the main tank through the vapor line and to the overflow tank via the first pressure regulator and the overflow line while the check valve remains closed;

increasing a saturation pressure within the main tank until the check valve opens such that cryogenic fluid flows from the overflow tank and the vapor head toward the use device via the overflow line, the withdrawal line, and the check valve;

causing a saturation pressure in the main tank to equalize to a saturation pressure in the overflow tank as a result of a thermal interconnect between the overflow tank and the main tank while the tank apparatus is in operation, wherein the saturation pressure in the main tank and the overflow tank exceeds a pressure that causes the check valve to open; and causing cryogenic fluid to flow from one of the overflow tank and the main tank toward the use device through the open check valve to provide a continuous supply of the cryogenic fluid to the use device from the main tank or the overflow tank.

2. The method of claim 1, wherein the use device is an automobile engine.

3. The method of claim 1, wherein the cryogenic liquid is liquid natural gas.

4. The method of claim 1, wherein:

the continuous supply of cryogenic fluid is facilitated by the hydraulic pressure of the main tank when the hydraulic pressure in the main tank is more than the saturation pressure in the main tank; and the continuous supply of cryogenic fluid is facilitated by the saturation pressure of at least one of the main tank and the overflow tank when the hydraulic pressure in the main tank is one of less than and equal to the saturation pressure in the main tank.

* * * * *